(12) United States Patent
Weisfield et al.

(10) Patent No.: US 9,588,235 B2
(45) Date of Patent: Mar. 7, 2017

(54) X-RAY IMAGER WITH CMOS SENSOR EMBEDDED IN TFT FLAT PANEL

(71) Applicant: Varian Medical Systems, Inc., Palo Alto, CA (US)

(72) Inventors: Richard Weisfield, Los Altos, CA (US); Richard Colbeth, Los Altos, CA (US); Ivan Mollov, Mountain View, CA (US); Arundhuti Ganguly, San Jose, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 54 days.

(21) Appl. No.: 14/229,610

(22) Filed: Mar. 28, 2014

(65) Prior Publication Data

US 2015/0003584 A1    Jan. 1, 2015

Related U.S. Application Data

(60) Provisional application No. 61/840,409, filed on Jun. 27, 2013.

(51) Int. Cl.
*G01T 1/20* (2006.01)

(52) U.S. Cl.
CPC .................. *G01T 1/2018* (2013.01)

(58) Field of Classification Search
CPC  G01T 1/2018; G01T 1/24; G01T 1/20; G01T 7/00
See application file for complete search history.

(56) References Cited

U.S. PATENT DOCUMENTS

| | | | |
|---|---|---|---|
| 4,870,667 A | 9/1989 | Brunnett et al. | |
| 6,442,238 B2* | 8/2002 | Meulenbrugge | G01T 1/2002 250/366 |
| 2005/0285044 A1 | 12/2005 | Mollov | |
| 2012/0051513 A1* | 3/2012 | Nishino | A61B 6/4007 378/63 |
| 2012/0145908 A1* | 6/2012 | Sato | 250/362 |
| 2013/0026377 A1 | 1/2013 | Ichimura et al. | |
| 2013/0126742 A1* | 5/2013 | Hayun et al. | 250/366 |

FOREIGN PATENT DOCUMENTS

KR    10-2012-0018666 A    3/2012

OTHER PUBLICATIONS

PCT, International Search Report and Written Opinion in PCT Application No. PCT/US2014/032259, Aug. 4, 2014, 15 pages.
Antonuk et al., "High resolution, high frame rate, flat-panel TFT array for digital imaging," Proc. SPIE 2163, (1994) 118-128.
Ganguly et al., "Micro-angiography for neuro-vascular imaging: Experimental evaluation and feasibility," Med. Phys. vol. 30, No. 11, Nov. 2003, 3018-3028.
(Continued)

*Primary Examiner* — Hoon Song
(74) *Attorney, Agent, or Firm* — Houst Consulting

(57) ABSTRACT

An x-ray imaging device include a scintillator layer configured to generate light from x-rays, a TFT detector array at the first surface of the scintillator layer to detect light generated in the scintillator, and a CMOS sensor at the second surface of the scintillator layer to detect light generated in the scintillator.

35 Claims, 7 Drawing Sheets

(56) References Cited

OTHER PUBLICATIONS

Jain et al., "A theoretical and experimental evaluation of the microangiographic fluoroscope: A high-resolution regionof-interest x-ray imager," Med. Phys. 38 (7), Jul. 2011, 4112-4126.

Korthout et al., "A wafer-scale CMOS APS imager for medical X-ray applications," in Proc. of 2009 International Image Sensor Workshop, Bergen, Norway, Jun. 22-28, 2009.

Gauntt et al., "X-ray tube potential, filtration, and detector considerations in dual-energy chest radiography," Med. Phys. 21 (2), Feb. 1994, 203-218.

\* cited by examiner

X-RAY IMAGER WITH CMOS SENSOR EMBEDDED IN TFT FLAT PANEL

TECHNICAL FIELD

Embodiments of this disclosure relate to x-ray imaging devices and methods. In particular, x-ray imaging devices with CMOS sensors embedded in a TFT flat panel are described.

BACKGROUND

Currently, most flat panel x-ray imagers are based on amorphous silicon (a-Si) thin-film transistor (TFT) sensor technology. While TFT flat panel imagers are capable of providing large field-of-view (FOV) images, they have limitations in resolution, low dose performance, and readout speed. Resolution is typically limited to approximately 70 μm for low speed mammography applications, and more typically 140 μm for radiographic imaging. In dynamic applications, in order to achieve reasonable low dose performance, larger effective pixel sizes of 180 μm to 400 μm are used, either in full resolution or binned modes of operation, with x-ray quantum-limited doses in the range of 3-10 nGy, dictated by the minimum electronic noise of approximately 1000e per pixel. Maximal readout speeds available are typically in the range of 15 frames per second (fps) for full resolution and 30 fps for binned resolution, limited by the speed of charge transfer in the pixel and the need to filter out electronic noise generated by the large parasitic data line capacitances in flat-panel imagers. Moreover, a-Si photodiodes are loaded with deep traps, which may lead to image ghosting artifacts.

Complementary metal-oxide-semiconductor (CMOS) image sensors have been developed that overcome limitations of resolution, low dose performance, and readout speed. Pixel amplifiers can boost the signals generated by x-ray photons, reducing the quantum limited doses by at least 10 times lower relative to a-Si TFT flat panels. While such amplifiers do take up significant space in a pixel, resolutions down to 50 μm can be readily achieved in this technology. Due to the much higher mobility of crystalline silicon (c-Si) and the lower pixel capacitances of photodiodes made in this technology, readout speeds are no longer limited by charge transfer in the pixel and higher bandwidth amplifiers can be used without compromising electronic noise. Readout speeds well above 100 fps are achievable with CMOS technology. Further, photodiodes made from c-Si do not typically contain significant levels of deep traps, and thus image ghosting originating from the photodiodes is absent in CMOS sensors.

CMOS image sensors are generally used in optical cameras and are not typically designed with high dynamic range and linearity requirements for X-ray imagers. X-ray sensors utilize full CMOS wafers (typically 8 or 12 inches in diameter) and are often tiled to achieve large-area formats. CMOS sensors can overcome many of the technical disadvantages of a-Si TFT flat panel detectors, but the cost of building a detector from multiple CMOS wafers is considered prohibitive for nearly all medical device applications.

SUMMARY

This disclosure provides an x-ray imaging device that includes a limited-area, high performance sensor, such as a CMOS image sensor superimposed on a large-area flat panel, such as an a-Si TFT image sensor. This unique design takes the advantage of the high performance characteristics obtainable from CMOS sensors with the inexpensive, large area characteristics of a-Si TFT panels. For example, in a typical large TFT flat panel detector having an active detection area of 30×30 cm, a 10×10 cm CMOS sensor may be embedded e.g. in the middle of the TFT panel detector. The resulting "hybrid" detector is incrementally much less expensive than a fully tiled CMOS sensor.

The resolutions of the CMOS sensor and the TFT flat panel detector can be designed so that the native resolution of the TFT flat panel detector is an integral multiple of that of the CMOS sensor. For example, a 50 μm CMOS sensor can be binned 4×4 to match a 200 μm TFT panel detector, or a 70 μm CMOS sensor can be binned 2×2 to match a 140 μm TFT panel detector. Software interpolation can be used to convert the higher resolution images from a CMOS sensor to match the lower resolution of a TFT flat panel detector.

The CMOS sensor and TFT panel detector may share a common scintillator layer such as CsI:Tl, which may be inserted between the TFT panel detector and CMOS sensor. A reflective coating or detachable reflector may cover the scintillator in the periphery to the CMOS sensor. Optical coatings on the scintillator in the periphery to the CMOS sensor can be selected to match the optical reflection characteristics of the CMOS sensor so that the TFT detector pixel response is minimally affected. Various embodiments and arrangements are provided to connect a smaller CMOS sensor in order to allow the adjoining TFT panel detector to operate normally.

The provided x-ray imaging device can be used in various ways. For general imaging, the TFT panel detector can be used by itself or combined with the CMOS sensor pixels using appropriate software to seamlessly combine the signals from the two imagers. When the user wishes to zoom in on a region of interest (ROI) and lower the radiation dose to the surrounding area, the user may center the detector over the ROI, and then switch the detector to read from the CMOS sensor at higher levels of resolution down to the native resolution of the CMOS sensor. This can be accomplished by blocking X-ray exposure peripheral to the ROI with programmable collimators. Alternatively, a low dose peripheral image can be obtained with low absorption collimators while the central zone is viewed at higher dose and resolution. An overall image including the ROI and the peripheral region can be obtained by using low absorption collimators which may provide a reduced dose surrounding a central zone of a higher dose.

This Summary is provided to introduce selected embodiments in a simplified form and is not intended to identify key features or essential characteristics of the claimed subject matter, nor is it intended to be used as an aid in determining the scope of the claimed subject matter. Other embodiments are described in the Detail Description.

BRIEF DESCRIPTION OF THE DRAWINGS

These and other features and advantages of the disclosed methods and apparatuses will become better understood upon reading of the following detailed description in conjunction with the accompanying drawings and the appended claims provided below, where:

DETAILED DESCRIPTION

Figure 1:
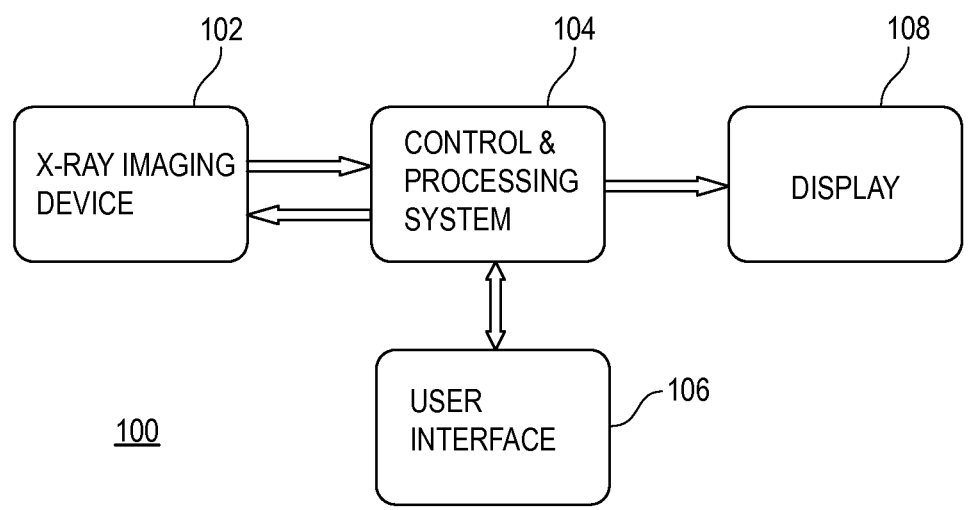
FIG. 1 is a block diagram schematically illustrating an imaging system according to some embodiments of this disclosure.

Various embodiments of an x-ray imaging device and an imaging method are described. It is to be understood that the disclosure is not limited to the particular embodiments described as such may, of course, vary. An aspect described in conjunction with a particular embodiment is not necessarily limited to that embodiment and can be practiced in any other embodiments. Further, in the following description, specific details such as examples of specific materials, dimensions, processes, etc. may be set forth in order to provide a thorough understanding of the disclosure. It will be apparent, however, to one of ordinary skill in the art that these specific details need not be employed to practice embodiments of the disclosure. In other instances, well known components or process steps may not be described in detail in order to avoid unnecessarily obscuring the embodiments of the disclosure.

Various relative terms such as "front," "back," "top," and "bottom," "upper," "lower," "above," "under," etc. may be used to facilitate description of various embodiments. The relative terms are defined with respect to a conventional orientation of a structure and do not necessarily represent an actual orientation of the structure in manufacture or use. The following detailed description is, therefore, not to be taken in a limiting sense. As used in the description and appended claims, the singular forms of "a," "an," and "the" include plural references unless the context clearly dictates otherwise. Thus, for example, reference to "a CMOS sensor" may include one or more CMOS sensors, and reference to "the TFT transistor" may include one or more TFT transistors of the structure described herein.

As used herein, the term "scintillator layer" refers to a functional layer in an x-ray imaging device which is configured to convert x-ray photons to visible light. In operation, a scintillator layer material interacts with x-ray photons, raising the energies of the atoms in the scintillator. When the energetically excited atoms in the scintillator decay back to their ground state they emit visible light. The visible light may then be detected by a detector array coupled to the scintillator layer.

As used herein, the term "TFT detector array" refers to a detector array that includes a plurality of detection pixels each comprising a photosensitive element and a thin-film transistor. A TFT detector array may be formed on a supporting and non-conducting base plate or substrate over which thin films of semiconductors, dielectrics and metallic contacts (TFT transistors) are deposited and photosensitive elements are formed. A TFT detector array and a base plate or substrate over which the TFT detector array is formed may be collectively referred to as a TFT detector panel or TFT panel in this disclosure.

As used herein, the term "CMOS detector array" refers to a detector array that includes a plurality of detection pixels each comprising a photosensitive element and a complementary metal-oxide-semiconductor circuit or polycrystalline silicon-oxide-semiconductor circuit. A CMOS detector array may be formed on a wafer or substrate which functions as an active semiconductor of CMOS circuits. A CMOS detector array and a semiconductor wafer over which the CMOS detector array is formed may be collectively referred to as a CMOS sensor in this disclosure.

As used herein, the term "different detectors" refers to first and second detectors having different pixel designs, architectures, or sizes, and/or having any other different features or structures that cause the first and second detectors to have different resolution, sensitivity, detection speed, and/or other characteristics. For example, a first detector is different from a second detector if the first detector comprises a TFT detector array and the second detector comprises a CMOS sensor. A first TFT detector is different from a second TFT detector if the pixel designs, architectures, and/or sizes are different, and/or if any other features of the first and second TFT detectors are different thereby causing the resolution, sensitivity, detection speed, and/or other characteristics of the first and second TFT detectors different.

An x-ray imaging device is provided in this disclosure. The x-ray imaging device may include a scintillator layer configured to generate visible light from x-rays and having a first surface and a second surface. The x-ray imaging device may include a first detector at the first surface configured to detect light generated in the scintillator layer, and a second detector at the second surface configured to detect light generated in the scintillator layer. The first detector and the second detector are different. By way of example, the first detector and the second detector may be different TFT detectors. The first detector may include a plurality of first detection pixels having a first pixel size, and the second detector may include a plurality of second detection pixels having optionally a second pixel size smaller than the first pixel size or the pixel size can be the same. Alternatively or in addition, the first detector may include a plurality of first detection pixels defining a first active detection area, and the second detector may include a plurality of second detection pixels defining a second active detection area smaller than the first active detection area. The plurality of the first detection pixels may have a first sensitivity and the plurality of the second detection pixels may have a second sensitivity greater than the first sensitivity. Alternatively or in addition, the plurality of first detection pixels may have a first detection speed, and the second plurality of second detection pixels may have a second detection speed greater than the first speed. Therefore, according to this disclosure, an x-ray imaging device is provided which includes different detectors sandwiching a single scintillator layer, wherein one of the detectors may be designed for a particular enhanced operation such as higher resolution, higher sensitivity and lower dose, higher speed, etc.

In some embodiments, the first detector may include a TFT detector array comprising a plurality of first detection pixels. The second detector may include a CMOS sensor comprising a plurality of second detection pixels. The first detection pixels of the TFT detector array have a first pixel size. The second detection pixels of the CMOS sensor have a second pixel size. The second pixel size of the CMOS sensor may be smaller than the first pixel size of the TFT detector array. In some embodiments, the first pixel size of the TFT detector array may be an integral multiple of the second pixel size of the CMOS sensor.

The first detector provides a first active detection area defined by the plurality of the first detection pixels of the TFT detector array. The second detector provides a second active detection area defined by the plurality of the second detection pixels of the CMOS sensor. The second active detection area provided by the CMOS sensor may be smaller than the first active detection area provided by the TFT detector array.

In some embodiments, the first active detection area provided by the TFT detector array may cover substantially the entire first surface of the scintillator layer. The second active detection area provided by the CMOS sensor may cover a portion of the second surface of the scintillator layer. In some embodiments, the portion of the second surface of the scintillator layer that is uncovered by the second active detection area of the CMOS sensor may be coated with a reflective coating. In some embodiments, a detachable reflector may be attached to the portion of the second surface of the scintillator layer that is uncovered by the second active area. In some embodiments, the portion of the second surface of the scintillator layer uncovered by the second active detection area may be applied with an optical coating that has a reflectivity substantially the same as the reflectivity of the CMOS sensor.

In some embodiments, the second detector may comprise two or more CMOS sensors tiled side by side to provide a greater active detection area e.g. in a rectangular or square shape. For example, the active detection area provided by the tiled CMOS sensors may cover substantially an entire width or side of the second surface of the scintillator layer.

The scintillator layer, the first detector, and the second detector in the x-ray imaging device may be arranged in various configurations. In some embodiments, the scintillator layer, the first detector, and the second detector may be arranged such that incident x-rays first traverse the TFT detector array before propagating in the scintillator layer. By way of example, the first detector may include a base plate which is substantially transparent to x-rays and a TFT detector array and be disposed at the first surface of the scintillator layer such that the TFT detector array is in between the base plate and the scintillator layer. As such, x-rays traverse the base plate and then the TFT detector array before propagating in the scintillator layer when in use.

The second detector may include a CMOS wafer and a plurality of detection pixels and be disposed at the second surface of the scintillator such that the detection pixels are in between the scintillator layer and the CMOS wafer. The CMOS wafer may be provided with a through via near the periphery so that electrical contacts such as flex connectors may be coupled to the CMOS detection pixels through the via. Alternatively, a fiber optical faceplate (FOFP) may be disposed in between the scintillator layer and the CMOS sensor. As such, the flex connectors may be coupled to the CMOS detection pixels without the need of a through via in the CMOS wafer. In some embodiments, the second detector may be disposed at the second surface of the scintillator such that the CMOS wafer is in between the scintillator layer and the CMOS detection pixels. As such, light generated in the scintillator passes through the CMOS wafer before being detected by the CMOS detection pixels.

In alternative embodiments, the scintillator layer, the first detector, and the second detector may be arranged such that x-rays traverse the CMOS sensor first before propagating in the scintillator layer. By way of example, the second detector may include a CMOS wafer and a plurality of detection pixels and be disposed such that the CMOS detection pixels are in between the scintillator layer and the CMOS wafer. A through via may be provided near the periphery of the CMOS wafer to allow electrical coupling to CMOS detection pixels through the via. In alternative embodiments, an additional thin layer of scintillator may be disposed between the CMOS detection pixels and the scintillator layer such that a space is provided between the scintillator layer and the periphery of the CMOS wafer to allow flex connectors to be coupled with CMOS detection pixels. In some embodiments, the second detector is disposed such that the CMOS wafer is in between the scintillator layer and the CMOS detection pixels such that light passes through the CMOS wafer before being detected by the CMOS detection pixels.

Exemplary embodiments will now be described with reference to the figures. It should be noted that some figures are not necessarily drawn to scale. The figures are only intended to facilitate the description of specific embodiments, and are not intended as an exhaustive description or as a limitation on the scope of the disclosure.

FIG. 1 is a block diagram schematically illustrating an exemplary imaging system 100 according some embodiments of this disclosure. The imaging system 100 may include an x-ray imaging device 102, a control and processing system 104, a user interface 106, and a display 108. By way of a user interface 106 such as a graphical user interface, keyboard, mouse, etc., the control and processing system 104 may generate control signals for the imaging device 102, which provides image data signals in return. The control and processing system 104 may process the image data signals, including combining image signals from a TFT panel and CMOS sensor of the imaging device as will be described in greater detail below, and provide processed images for display on the display 108.

Figure 2:
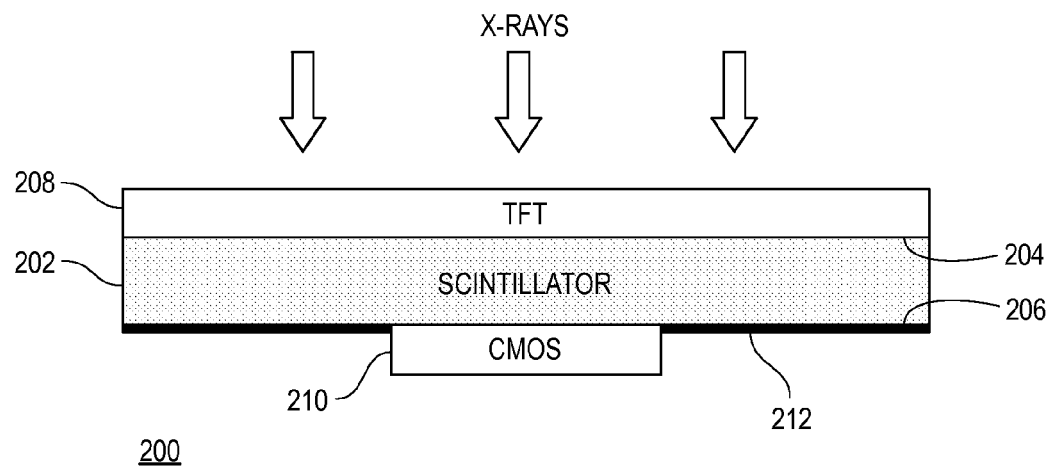
FIG. 2 schematically illustrates an exemplary imaging device comprising a TFT panel, a scintillator layer, and a CMOS sensor according to some embodiments of this disclosure.

FIG. 2 schematically shows an exemplary imaging device 200 according to some embodiments of this disclosure. The imaging device 200 includes a scintillator layer 202 having a first surface 204 and a second surface 206. As shown in FIG. 2, the first surface 204 of the scintillator layer 202 may be a front surface facing incident x-rays. A first detector 208 including a TFT detector array may be disposed at the first surface 204 and configured to detect light generated in the scintillator layer 202. A second detector 210 including a CMOS detector array may be disposed at the second surface 206 and configured to detect light generated in the scintillator layer 202. As shown in FIG. 2, the first detector 208, the scintillator layer 202, and the second detector 210 may be arranged such that x-rays traverse the TFT detector array 208 before propagating in the scintillator layer 202.

The TFT detector 208 may include a plurality of first detection pixels defining a first active detection area that may cover substantially the entire first surface 204 of the scintillator layer 202. The CMOS detector 210 may include a plurality of second detection pixels defining a second active detection area that may cover a portion of the second surface 206 of the scintillator layer 202, e.g., a middle or central portion. The portion of the second surface 206 of the scintillator layer 202 that is uncovered by the second active detection area of the CMOS detector 210 may be coated with a reflective coating 212. Alternatively, a detachable reflector may be attached to the uncovered portion of the second surface of the scintillator layer. The optical coating 212 or the detachable reflector on the uncovered portion of the second surface may be selected to match the optical reflection characteristics of the CMOS detector 210 so that the pixel response of the TFT detector 208 is minimally affected.

Figure 3:
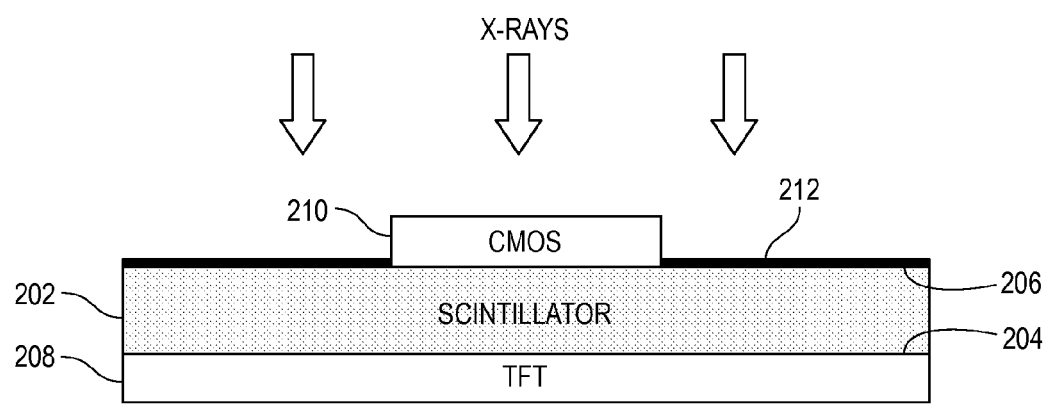
FIG. 3 schematically illustrates an exemplary imaging device comprising a CMOS sensor, a scintillator layer, and a TFT panel according to some embodiments of this disclosure.

FIG. 3 schematically shows an alternative embodiment of an exemplary imaging device 300. The imaging device shown in FIG. 3 is similar to the imaging device 200 shown in FIG. 2 in many aspects. For example, the imaging device 300 may include a scintillator layer 202 having a first surface 204 and a second surface 206, a first detector 208 including a TFT detector array disposed at the first surface 204, and a second detector 210 including a CMOS detector array disposed at the second surface 206. The TFT detector 208 may provide a first active detection area that may cover substantially the entire first surface 204 of the scintillator layer 202. The CMOS detector 210 may provide a second active detection area that may cover a portion of the second surface 206 of the scintillator layer 202 such as a middle or central portion. The portion of the second surface 206 of the scintillator layer 202 that is uncovered by the second active detection area of the CMOS detector 210 may be coated with a reflective coating 212. Alternatively, a detachable reflector may be attached to the uncovered portion of the second surface 206 of the scintillator layer 202. Unlike the configuration of the imaging device 200 shown in FIG. 2, in the imaging device 300 shown In FIG. 3, the second surface 206 of the scintillator layer 202 is a front surface facing incident x-rays. The first detector 208, the scintillator layer 202, and the second detector 210 are arranged such that x-rays traverse the CMOS detector 210 first before propagating in the scintillator layer 202.

The scintillator layer 202 may include any suitable scintillator material configured to generate visible light from x-rays. Exemplary scintillator materials include and are not limited to gadolinium oxisulfide ($Gd_2O_2S$:Tb), cadmium tungstate ($CdWO_4$), bismuth germanate ($Bi_4Ge_3O_{12}$ or BGO), cesium iodide (CsI), cesium iodide thallium (CsI:Tl), or any combination thereof. The scintillator may be structured or pixellated. A structured scintillator may include columnar or needle-like structures, which may act as light pipes channeling light emitted within them toward detection pixels. A pixellated scintillator matrix may be formed by slicing the scintillator crystal into parallelepipeds, which are then coated with a layer of reflective or absorptive coating and joined back together. A structured or pixellated scintillator may reduce light spread in the scintillator and help improve resolution. Alternatively, the scintillator layer can be non-structured or non-pixellated. Use of a clear or continuous scintillator or phosphor screen may reduce the cost of making imaging devices.

The TFT detector 208 may include a plurality of detection pixels configured to generate electrical signals in response to light produced in the scintillator layer 202. The structures and methods of making TFT detector array are known in the art, and thus their detailed description is omitted herein to avoid obscuring the description of embodiments of this disclosure. Generally, a TFT detector array may be formed on a base plate or substrate made of such as glass, plastics, or other such materials, by depositing and patterning thin films of semiconductors, dielectrics and metallic contacts. A TFT detector array may include a large number of e.g. hundreds of thousands or millions of detection pixels arranged in rows and columns or other patterns forming an active detection area. Each detection pixel may have a pixel size ranging from approximately 70 µm to 400 µm. Each detection pixel may include a photosensitive element for converting light into electrical charges and a thin-film transistor for accessing the electrical charges. The photosensitive element may be a photodiode, a photogate, phototransistors, or other photosensitive elements. The thin-film transistor may be amorphous silicon (a-Si) TFT. The detection pixels may be accessed by a driver circuit and the electrical signals may be received by a readout circuit. The electrical coupling or connection to the detection pixels may be accomplished by e.g. tape-automated-bonding (TAB) or wire bonding. The electrical signals may be amplified, converted by analog-to digital converters (ADCs), and the resulting digitized signal data can be then multiplexed, buffered, and transmitted to a control and processing system for further processing (FIG. 1).

The CMOS detector 210 may include a plurality of detection pixels configured to generate electric signals in response to the light produced in the scintillator layer 202. The structures and methods of making CMOS detector arrays are known in the art, and thus their detailed description is omitted here to avoid obscuring the description of embodiments of this disclosure. In general, advanced submicron or deep submicron (0.5 µm, 0.35 µm, 0.25 µm, 0.18 µm) CMOS technology is available for fabricating CMOS sensors on semiconductor wafers, which are typically 8 or 12 inches in diameter. A CMOS sensor may include a large number of detection pixels arranged in rows and columns or other patterns forming an active detection area. CMOS technology allows for smaller pixels and flexible readout schemes for image detectors. Therefore, CMOS imagers can record smaller objects with higher resolutions. By way of example, each CMOS pixel may have a pixel size ranging from 10-100 µm. Each detection pixel may include a photosensitive element such as a photodiode for converting light into electrical charges and one or more MOS transistors. A CMOS detection pixel may be formed in a passive pixel architecture, in which each pixel includes a photodiode for converting photons to electrical charges and a transistor for accessing the charges produced. A CMOS detection pixel may also be formed in an active pixel architecture, in which each pixel may include a photodiode and more transistors to increase signal-to-noise ratio. An amplifier transistor may be included in a pixel to boost the signals, reducing the quantum limited doses by at least 10 times lower relative to a-Si TFT flat panels. The pixel signals may be accessed by a readout circuitry and the electrical coupling or connection to the CMOS pixels can be accomplished by e.g. tape-automated-bonding (TAB), wire bonding, or other flexible connectors. The electrical signals may be amplified, converted by analog-to digital converters (ADCs), and the resulting digitized signal data can be then multiplexed, buffered, and transmitted to a control and processing system for further processing (FIG. 1).

In some embodiments, the CMOS sensor 210 may be constructed to possess radiation hardness, or withstand damages caused by x-ray radiation. Methods of making CMOS sensors radiation hard are known in the art and thus their detailed description is omitted herein. In general, the radiation hardness of a CMOS sensor may be accomplished by using physical design techniques, including enclosed geometry, guard ring, and other suitable radiation hardened layouts.

In some embodiments of this disclosure, two or more CMOS sensors 210 may be tiled to provide a greater active detection area. For example, two or four CMOS sensors may be tiled side by side to provide a greater active detection area in a rectangular or square shape or other suitable shape. The combined detection area may cover substantially an entire width or side of the second surface 206 of the scintillator layer 202.

In some embodiments, the detection pixels of the CMOS sensor 210 may have a smaller pixel size than that of the detection pixels of the TFT detector 208. In some embodiments, the pixel size of the TFT detector 208 may be an integral multiple of the pixel size of the CMOS sensor 210. By way of example, the CMOS sensor 210 may have a pixel size of 50 µm and the CMOS pixels may be binned 4×4 in operation to match a 200 µm pixel size of a TFT detector 208. In another example, the CMOS sensor 210 may have a pixel size of 70 µm and the CMOS pixels may be binned 2×2 in operation to match a 140 µm pixel size of a TFT detector 208. Software interpolation can be used to convert the higher resolution images from the CMOS sensor to match the lower resolution of the TFT detector.

Returning to FIG. 1, the control and processing system 104 may include software programs configured to seamlessly combine image signals from the CMOS and TFT detector arrays under various modes of binning and zoom levels. Software programs may be constructed to treat the boundaries between the CMOS and TFT detector arrays by interpolating the pixel values at the boundary and filling in the values in order to make a smooth transition between the two images. Software programs may also be constructed to match the contrast between the images from the CMOS and TFT detector arrays since the two units may have different x-ray sensitivities. In some embodiments, the imaging system 100 shown in FIG. 1 may further include collimators constructed with x-ray filtering materials (not shown), and the control system 104 may be configured to control the operation of the collimators and/or x-ray source so that the central area of the imaging device 102 covered by the CMOS detector array of high resolution may receive a higher dose for obtaining a high signal to noise ratio, and the peripheral area outside the CMOS detector array may receive a lower dose for obtaining a bigger overall image by the TFT detector array while reducing dose to the patient. The collimators may include one or more movable leaves to provide different levels of x-ray attenuation. U.S. application Ser. No. 14/037,763 filed Sep. 26, 2013 entitled "Real-Time Moving X-Ray Collimators Made with X-Ray Filtering Material" describes various embodiments of collimators which can be used in conjunction with various embodiments of the imaging device of this disclosure. The disclosure of U.S. application Ser. No. 14/037,763 is incorporated herein by reference in its entirety. In order to flatten the pixel signal level across the entire image, the peripheral image may provide feedback to the collimator control to increase or decrease x-ray attenuation in order to obtain image signals similar to the lower signal levels expected in the high resolution areas.

Figure 4:
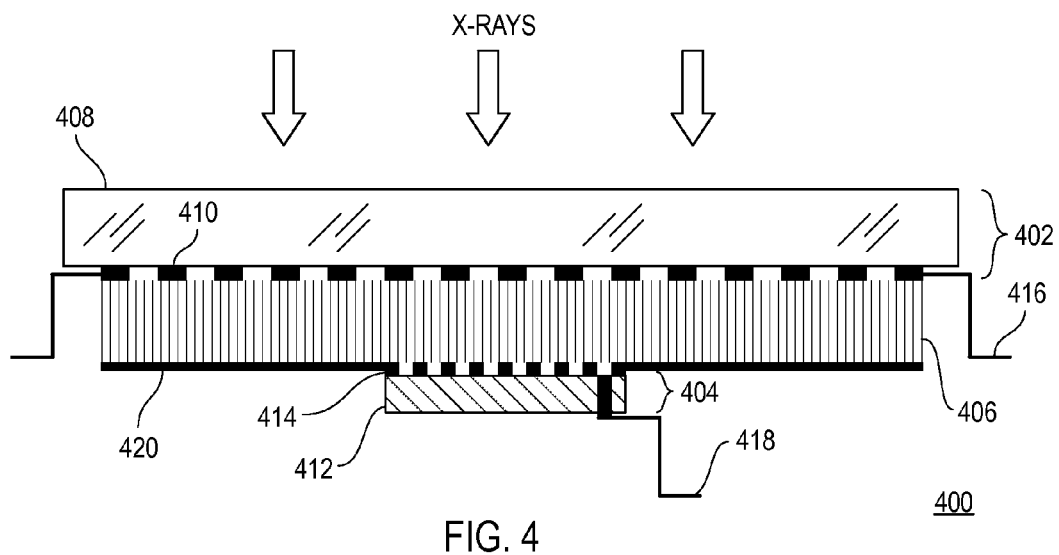
FIGS. 4-6 schematically illustrate various embodiments of exemplary imaging devices where x-rays traverse a TFT panel before propagating in a scintillator layer according to some embodiments of this disclosure.

Referring now to FIG. 4, an exemplary imaging device 400 will be described. The imaging device 400 includes a TFT flat panel detector 402, a CMOS sensor 404, and a scintillator layer 406 between the TFT flat panel 402 and the CMOS sensor 404. The TFT flat panel 402, the scintillator layer 406, and the CMOS sensor 404 are arranged such that x-rays traverse the TFT flat panel 402 before propagating in the scintillator layer 406.

The TFT flat panel 402 may include a substrate 408 made of e.g. glass or other transparent materials, and a TFT detector array 410 that may be deposited on the substrate 408 or formed overlaying the substrate 408 in any suitable ways. The CMOS sensor 404 may include a wafer 412 and a CMOS detector array 414 fabricated on the wafer 412. The CMOS sensor 404 may include circuits that collect charges generated by x-rays directly in the CMOS wafer and shunt the charges to the ground to prevent sparkle noise. The scintillator layer 406 may be deposited directly on the TFT flat panel 402 and the CMOS sensor 404 may be coupled to the scintillator layer 406 by e.g. gluing, pressing or other suitable ways. Alternatively, the scintillator layer 406 may be deposited on a detachable plate such as aluminum or carbon fiber plate with a window in which the CMOS sensor 404 is mounted. The scintillator layer 406 may be evaporated on an assembly which includes the detachable plate and the CMOS sensor 404 and then the assembly may be coupled to the TFT panel 402 by e.g. gluing pressing or other suitable ways. The TFT panel 402 may provide a relatively large active detection area such as 30×30 cm or 30×40 cm. The scintillator layer 406 may cover substantially the entire active detection area of the TFT detector array 402. The CMOS sensor 404 may provide a limited active detection area such as 10×10 cm and may be centered beneath the scintillator layer 406.

The contact to the detection pixels of the TFT panel 402 may be made by tape-automated-bonding (TAB), wire bonding, or other suitable means 416. The contact to the detection pixels 414 of the CMOS sensor 404 may be made by suitable flexible connectors 418. Through-vias and suitable metallic contacts may be formed in the CMOS wafer 412 during fabrication of the CMOS sensor 404 to allow access to the detection pixels 414 by flex connectors 418 through the back of the CMOS wafer 404.

Still referring to FIG. 4, the entire assembly of the TFT panel 402, the scintillator layer 406, and the CMOS sensor 404 may be sealed with a moisture barrier (not shown), such as perylene or the like. Optionally, the entire assembly may be painted with different materials either to enhance the reflectivity of the scintillator in the periphery of the TFT panel or appropriately blacken the area around the periphery of the CMOS sensor so that the reflectivity of the scintillator is similar to the reflectance off of the CMOS sensor. Alternatively, a detachable reflector can be mounted around the periphery of the CMOS sensor. In this manner, the sensitivity of the peripheral TFT detection pixels can either be enhanced or better matched to the central pixels of the array. As shown in FIG. 4, an optical coating 420 may be applied around the CMOS sensor 404.

In operation, x-rays enter the imaging device 400 through the back side of the TFT panel 402, i.e., x-rays traverse the substrate 402 and then the detector array 410 before propagating in the scintillator 406. Light generated near the interface of the scintillator 406 and the TFT panel 402 may be detected by the large area of the TFT detector array 410. Light generated near the interface of the scintillator 406 and the CMOS sensor 404 may be detected by the CMOS detection pixels 414 with a high resolution.

Figure 5:
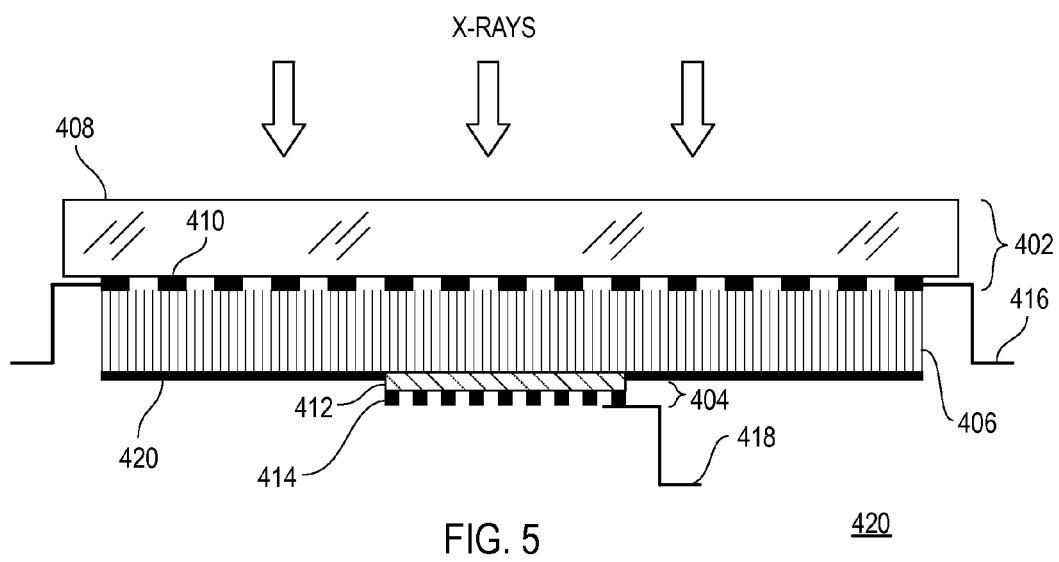

FIG. 5 illustrates an exemplary imaging device 420, which is a variation of the imaging device 400 shown in FIG. 4. In comparison, the imaging device 420 shown in FIG. 5 is similar to the imaging device 400 shown in FIG. 4 in many aspects, and includes a TFT flat panel detector 402, a CMOS sensor 404, and a scintillator layer 406 between the TFT flat panel 402 and the CMOS sensor 404. The TFT flat panel 402, the scintillator layer 406, and the CMOS sensor 404 are arranged such that x-rays traverse the TFT flat panel 402 before propagating in the scintillator layer 406. Unlike the imaging device 400 shown in FIG. 4, the CMOS sensor 404 in the imaging device 420 shown in FIG. 5 is flipped upside down, or disposed such that light generated in the scintillator layer 406 passes through the CMOS wafer 412 before being detected by the CMOS detection pixels 414. This configuration may be advantageous in that access to the CMOS detection pixels 414 by flexible connectors 418 may be easier without the need for through-vias in the CMOS wafer 412. Backside illuminated CMOS sensor 404 may also offer the possibility of stacking electronic circuitry over the photosensitive elements in the CMOS sensor 404, and as a result, the space for photodiodes and storage capacitors in the pixel circuits can be maximized, allowing for a higher fill factor and dynamic range for the CMOS sensor. In some embodiments, the CMOS wafer 412 can be thinned to e.g. approximately 10 μm in making the backside illuminated sensor.

Figure 6:
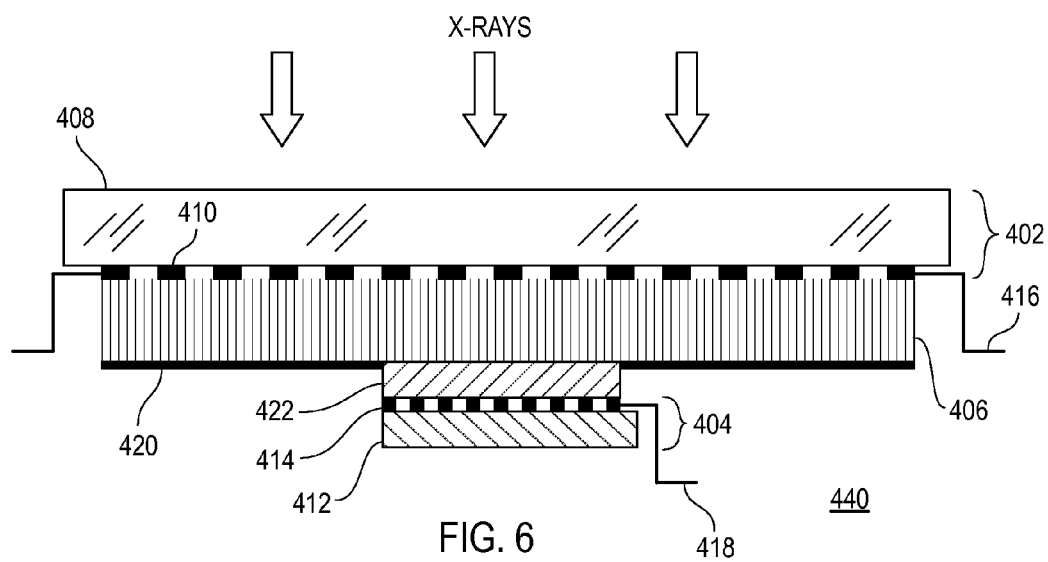

FIG. 6 illustrates an exemplary imaging device 440, which is a further variation of the imaging device 400 shown in FIG. 4. In comparison, the imaging device 440 shown in FIG. 6 is similar to the imaging device 400 shown in FIG. 4 in many aspects, and includes a TFT flat panel detector 402, a CMOS sensor 404, and a scintillator layer 406 between the TFT flat panel 402 and the CMOS sensor 404. The TFT flat panel 402, the scintillator layer 406, and the CMOS sensor 404 are arranged such that x-rays traverse the TFT flat panel 402 before propagating in the scintillator layer 406. Unlike the imaging device 400 shown in FIG. 4, the imaging device 440 shown in FIG. 6 further includes a fiber optic faceplate (FOFP) 422 between the scintillator layer 406 and the CMOS sensor 404. The fiber optic faceplate 422 may transfer light photons generated in the scintillator 406 directly, and without resolution loss, to the upwardly facing CMOS sensor 404. The FOFP 422 may contain lead glass fibers in order to prevent direct interactions of x-rays with the CMOS sensor 404, which otherwise may cause sparkle noise. The fiber optic faceplate 422 may also provide a space between the scintillator layer 406 and the CMOS sensor 404 periphery to allow flexible connectors 418 to contact the CMOS detection pixels 414 on the top of the CMOS sensor 404.

Figure 7:
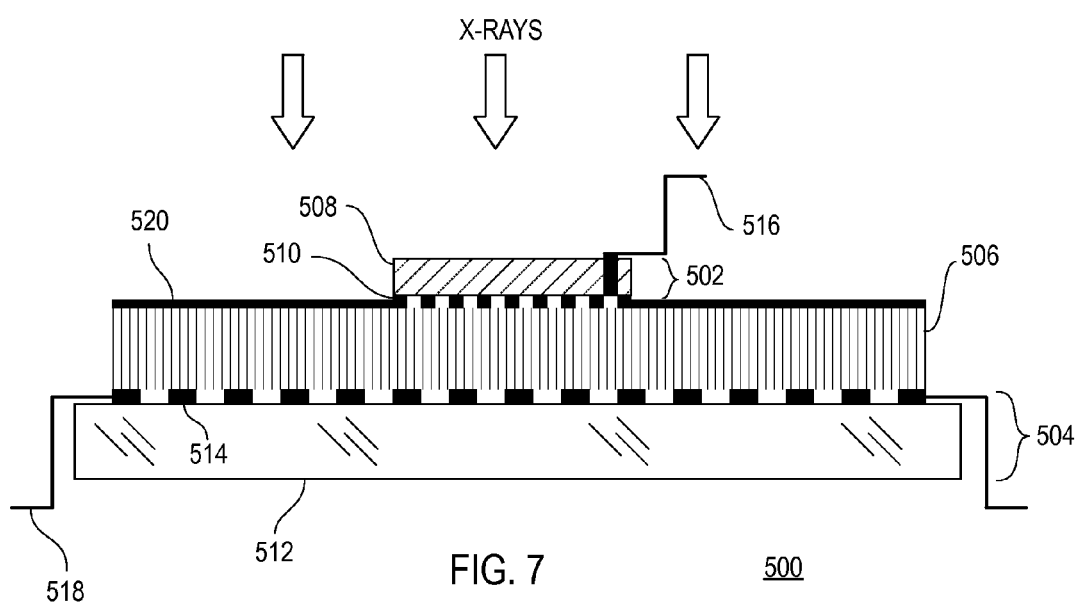
FIGS. 7-10 schematically illustrate various embodiments of exemplary imaging devices where x-rays traverse a CMOS sensor before propagating in a scintillator layer according to some embodiments of this disclosure.

Referring to FIG. 7, another exemplary imaging device 500 will now be described. The imaging device 500 includes a CMOS sensor 502, a TFT flat panel detector 504, and a scintillator layer 506 between the CMOS sensor 502 and the TFT flat panel 504. The CMOS sensor 502, the scintillator layer 506, and the TFT flat panel 504 are arranged such that x-rays may traverse the CMOS sensor 504 before propagating in the scintillator layer 506.

The CMOS sensor 502 may include a wafer 508 and a detector array 510 fabricated on the wafer 508. The CMOS sensor 502 may include circuits that collect charges generated by x-rays directly in the CMOS wafer and shunt the charges to the ground to prevent sparkle noise. The CMOS circuits may be designed and fabricated with sufficient RAD hardness to avoid generation of defects in the CMOS sensor.

The TFT flat panel 504 may include a substrate 512 made of e.g. glass or other transparent materials and a TFT detector array 514. The scintillator layer 506 may be deposited directly on the TFT panel 504 and overlaying the TFT detector array 514 through e.g. scintillator evaporation processes. The CMOS detector array 510 on wafer 508 may be coupled to the scintillator 506 by e.g. gluing, pressing or other suitable ways. Alternatively, the scintillator 506 may be deposited on a detachable plate such as aluminum or carbon fiber plate with a window in which the CMOS sensor 502 is mounted. The scintillator 506 may be evaporated on an assembly which includes the detachable plate and the CMOS sensor and then the assembly may be coupled to the TFT panel 504 by e.g. gluing pressing or other suitable ways. The TFT panel 504 may provide a relatively large active detection area such as 30×30 cm or 30×40 cm. The scintillator layer 506 may cover substantially the entire active detection area of the TFT panel 504. The CMOS sensor 502 may provide a limited active detection area such as 10×10 cm and may be centered beneath the scintillator layer.

In the embodiment shown in FIG. 7, the TFT panel 504 faces upward or disposed such that the TFT detector array 514 in contact with the scintillator layer 506. The CMOS sensor 502 is flipped upside down or disposed such that the CMOS detection pixels 510 are in contact with the scintillator layer 506. The CMOS sensor 502 is shown in the center of the device; however, the CMOS sensor 502 may also be located proximal to a side or other locations of the device.

The entire assembly of the CMOS sensor 502, the scintillator layer 506, and the TFT panel 504 may be sealed with a moisture barrier (not shown), such as perylene or the like. Optionally, the scintillator in the periphery of the CMOS sensor may be coated with an optical coating 520 to either enhance or reduce the reflectivity of the TFT panel 504 so that the reflectivity of the TFT pixels 514 in the center of the panel is better matched with the rest of the TFT panel. Alternatively, a detachable reflector can be mounted around the periphery of the CMOS sensor 502.

In FIG. 7, the electrical connection to the detection pixels 510 of the CMOS sensor 502 may be made through the back 510 of the wafer 508. For example, through vias in the wafer 508 may be formed during fabrication of the CMOS sensor 502 to allow flexible connectors 516 to connect with the detection pixels 510. The flex connectors 516 may be made sufficiently thin so that it will not substantially attenuate the x-rays through them. The shadow which may be caused by the flex connectors 516 can be corrected during image processing using suitable software. The electrical connection to the detection pixels 514 of the TFT panel 504 may be made by tape-automated-bonding (TAB), wire bonding or other suitable means 518.

Still referring to FIG. 7, in operation, x-rays enter the imaging device 500 through the back side of the CMOS sensor 502, i.e., x-rays traverse the CMOS wafer 508 and then CMOS detection pixels 510 before propagating in the scintillator layer 506. Light generated near the interface of the scintillator layer 506 and the CMOS sensor 510 may be detected by the CMOS detection pixels 510 with a high resolution. Light generated near the interface of the scintillator 506 and the TFT panel 504 may be detected by the large area of the TFT detector array 514.]

Figure 8:
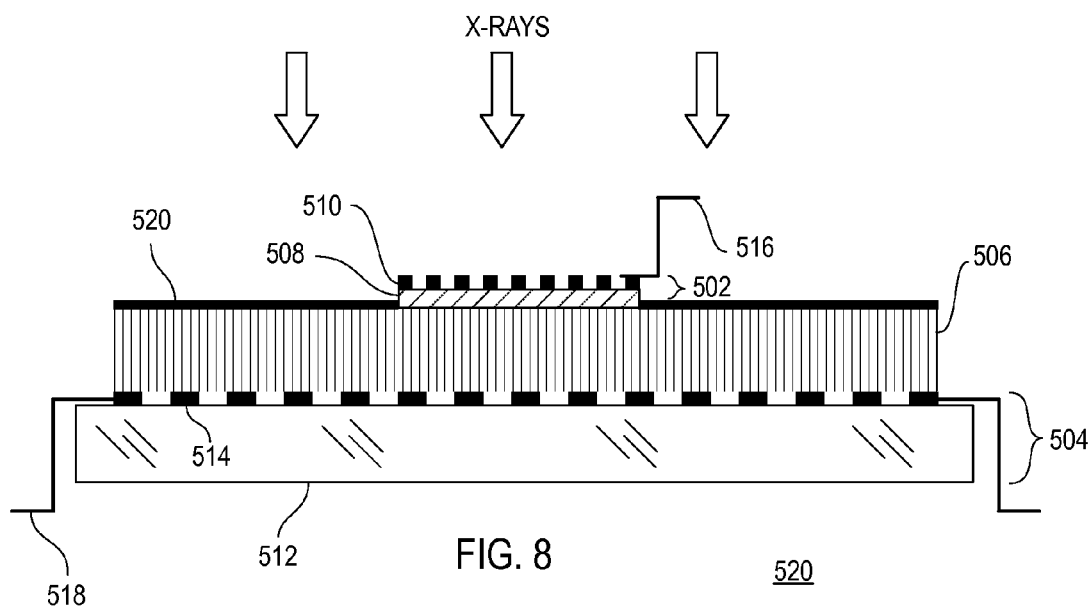

FIG. 8 illustrates an exemplary imaging device 520 which is a variation of the imaging device 500 shown in FIG. 7. In comparison, the imaging device 520 shown in FIG. 8 is similar to the imaging device 500 shown in FIG. 7 in many aspects. For example, the imaging device 520 shown in FIG. 8 includes a CMOS sensor 502, a TFT flat panel detector 504, and a scintillator layer 506 between the CMOS sensor 502 and TFT flat panel 504. The CMOS sensor 502, the scintillator layer 506, and the TFT flat panel 504 are arranged such that x-rays traverse the CMOS sensor 502 before propagating in the scintillator layer 506. Unlike the imaging device 500 shown in FIG. 7, in the imaging device 520 shown in FIG. 8, the CMOS sensor 502 faces upward, or disposed such that the CMOS wafer 508 is in contact with the scintillator layer 506 and light generated in the scintillator 506 passes through the CMOS wafer 508 before being detected by the CMOS detection pixels 510 in operation. The flex connection 516 with the CMOS detection pixels 510 can be made on the top of the CMOS sensor 502. Further, the CMOS wafer 508 can be thinner e.g. to about 10

μm to reduce x-ray attenuation to the underlying scintillator 506. This configuration may offer the possibility of stacking electronic circuitry over the photodiodes in the CMOS sensor 502, and as a result, the space for the photodiodes and storage capacitors in the pixel circuits can be maximized, allowing for a higher fill factor and dynamic range for the CMOS sensor 502.

Figure 9:
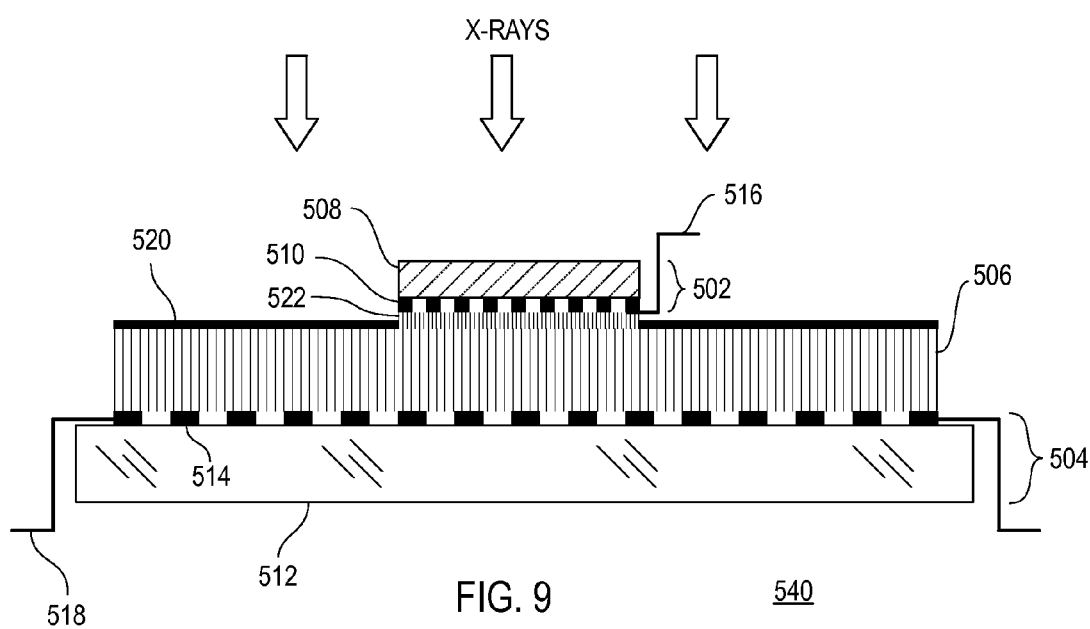

FIG. 9 illustrates an exemplary imaging device 540 which is a further variation of the imaging device 500 shown in FIG. 7. In comparison, the imaging device 540 shown in FIG. 9 is similar to the imaging device 500 shown in FIG. 7 in many aspects. For example, the imaging device 540 shown in FIG. 9 includes a CMOS sensor 502, a TFT flat panel detector 504, and a scintillator layer 506 between the CMOS sensor 502 and TFT flat panel 504. The CMOS sensor 502, the scintillator layer 506, and the TFT flat panel 504 are arranged such that x-rays traverse the CMOS sensor 502 before propagating in the scintillator layer 506. Unlike the imaging device 500 shown in FIG. 7, in the imaging device 540 shown in FIG. 9, a thin layer of a scintillator material 522 may be deposited on top of the detection pixels 510 of the CMOS sensor 502. The composition of scintillator layer 522 may be the same as or different from that of the scintillator layer 506. The thickness of the scintillator layer 522 may be selected to allow electrical connector 516 to connect with the detection pixels 510 of the CMOS sensor 502 but not so large as to significantly attenuates the x-rays passing through the CMOS sensor 502 entering the underlying TFT detector array 514. In general, the thickness of the scintillator layer 522 can be 25-150 μm. The electrical connection 518 to the detection pixels 514 of the TFT panel 504 may be made by tape-automated-bonding (TAB), wire bonding or other suitable means.

Figure 10:
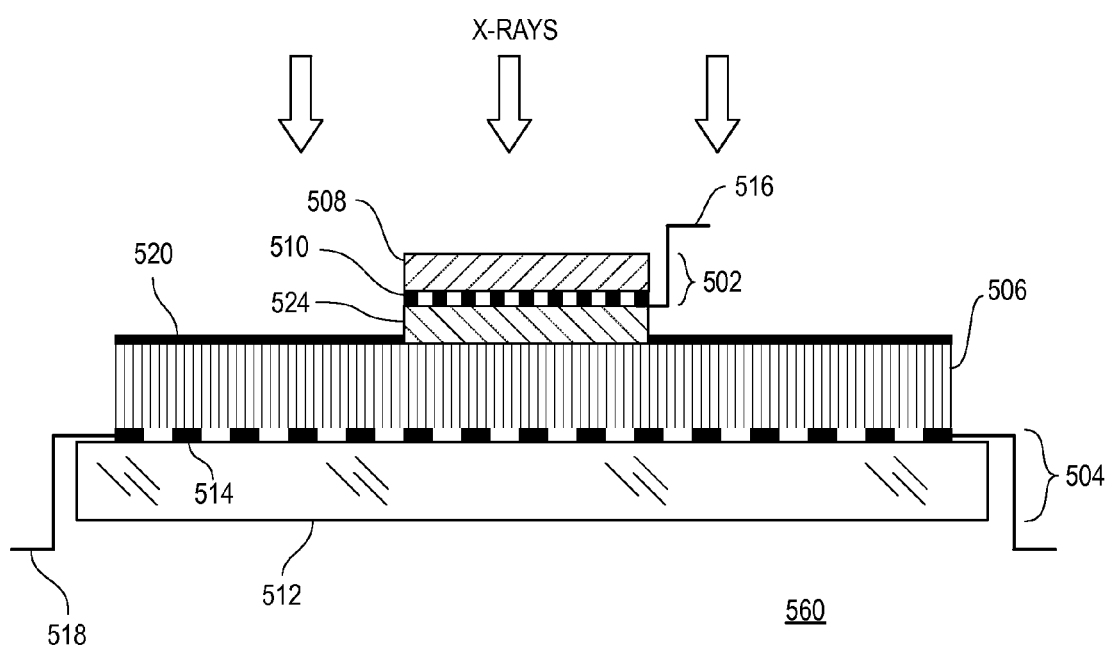

FIG. 10 illustrates an exemplary imaging device 560, which is a further variation of the imaging device 500 shown in FIG. 7. In comparison, the imaging device 560 shown in FIG. 10 is similar to the imaging device 500 shown in FIG. 7 in many aspects, and includes a CMOS sensor 502, a TFT flat panel detector 504, and a scintillator layer 506 between the CMOS sensor 502 and the TFT flat panel 504. The CMOS sensor 502, the scintillator layer 506, and the TFT flat panel 502 are arranged such that x-rays traverse the CMOS sensor 502 before propagating in the scintillator layer 506. Unlike the imaging device 500 shown in FIG. 7, the imaging device 560 shown in FIG. 10 further includes a fiber optic faceplate (FOFP) 524 between the scintillator layer 506 and the CMOS sensor 502. The fiber optic faceplate 524 may transfer light photons generated in the scintillator 506 directly, and without resolution loss, to the downwardly facing CMOS sensor 502. The FOFP 524 may be x-ray transparent so that x-rays may pass through it to excite the underneath scintillator 506. The FOFP 524 may also provide a space between the scintillator layer 506 and the CMOS sensor 502 periphery to allow flexible connectors 516 to contact the CMOS detection pixels 510, eliminating the need for through vias in the CMOS wafer 508.

Figure 11:
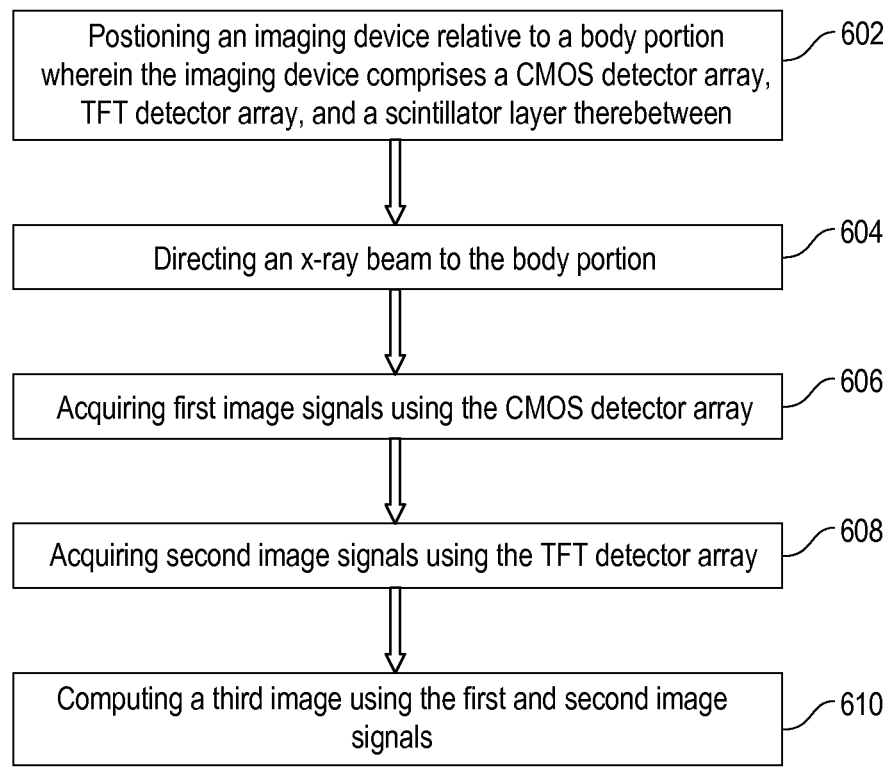
FIG. 11 is a flow chart illustrating an exemplary imaging method according to some embodiments of this disclosure.

FIG. 11 is a flow chart illustrating an exemplary imaging method according to some embodiments of this disclosure. The imaging device can be any imaging device described above in connection with FIGS. 1-10. For example, the imaging device may include a first detector array (e.g. a CMOS detector array), a second detector array (e.g. a TFT detector array), and a scintillator layer between the first and the second detector arrays. The first detector array may comprise a plurality of first detection pixels defining a first active detection area, and the second detector array may comprise a plurality of second detection pixels defining a second active detection area greater than the first active detection area. In the method, the imaging device may be positioned relative to a body portion to be imaged (602). Then an x-ray beam may be directed to the body portion (604). First image signals may be acquired using the first detector array (606). Second image signals may be acquired the second detector array (608). A third image may be computed using the first and second image signals (610). In computing the third image, the first image signals and the second image signals may be interpolated using algorithms known in the art.

In some embodiments, the x-ray beam may be collimated to provide a first beam portion and a second beam portion. The first beam portion may have a first dose level. The second beam portion may have a second dose level smaller than the first dose level. As such, the first image signals may be acquired using the first beam portion and the first detector array and the second image signals may be acquired using the second beam portion and the second detector array.

Exemplary embodiments of an imaging device have been described. Those skilled in the art will appreciate that various modifications may be made within the spirit and scope of the disclosure. All these or other variations and modifications are contemplated by the inventors and within the scope of the disclosure.

The invention claimed is:

1. An x-ray imaging device, comprising:
    a scintillator layer configured to generate light from x-rays, said scintillator layer comprises a first surface and a second surface;
    a first detector at the first surface configured to detect light generated in the scintillator layer, said first detector comprises a plurality of first detection pixels configured to generate a first image with a first resolution; and
    a second detector at the second surface configured to detect light generated in the scintillator layer, said second detector comprises a plurality of second detection pixels configured to generate a second image with a second resolution, wherein the second detection pixels are different from the first detection pixels, and the first resolution of the first image differs from the second resolution of the second image.

2. The x-ray imaging device of claim 1 wherein the first detector comprises a thin-film transistor (TFT) detector array comprising the plurality of first detection pixels having a first pixel size, and the second detector comprises a complementary metal-oxide-semiconductor (CMOS) sensor comprising the plurality of second detection pixels having a second pixel size smaller than the first pixel size.

3. The x-ray imaging device of claim 2 wherein the first pixel size is an integral multiple of the second pixel size.

4. The x-ray imaging device of claim 3 wherein the scintillator layer, the first detector, and the second detector are arranged in a configuration such that x-rays traverse the TFT detector array before propagating in the scintillator layer.

5. The x-ray imaging device of claim 4 wherein the first detector comprises a base plate and the TFT detector array, and the first detector is disposed such that the TFT detector array is in between the base plate and the scintillator layer.

6. The x-ray imaging device of claim 5 wherein the CMOS sensor comprises a wafer and the plurality of second detection pixels, and the CMOS sensor is disposed such that the plurality of second detection pixels are in between the scintillator layer and the wafer.

7. The x-ray imaging device of claim 6 further comprising a fiber optical faceplate (FOFP) disposed in between the scintillator layer and the CMOS sensor.

8. The x-ray imaging device of claim 6 wherein the wafer of the CMOS sensor has a through via near a periphery of the wafer to allow electrical coupling to the second detection pixels through the via.

9. The x-ray imaging device of claim 5 wherein the CMOS sensor comprises a wafer and the plurality of second detection pixels, and the CMOS sensor is disposed such that the wafer is in between the scintillator layer and the plurality of second detection pixels such that light detected by the second detection pixels passes through the wafer.

10. The x-ray imaging device of claim 3 wherein the scintillator layer, the first detector, and the second detector are arranged in a configuration such that x-rays traverse the CMOS sensor before propagating in the scintillator layer.

11. The x-ray imaging device of claim 10 wherein the first detector comprises a base plate and the TFT detector array, and the first detector is disposed such that TFT detector array is in between the scintillator layer and the base plate.

12. The x-ray imaging device of claim 11 wherein the CMOS sensor comprises a wafer and the plurality of second detection pixels, and the CMOS sensor is disposed such that the plurality of second detection pixels are in between the scintillator layer and the wafer.

13. The x-ray imaging device of claim 12 wherein the wafer of the CMOS sensor has a through via near a periphery of the wafer to allow electrical coupling to the second detection pixels through the via.

14. The x-ray imaging device of claim 12 further comprising an additional scintillator layer between the CMOS sensor and the scintillator layer, said additional scintillator layer is in contact with the scintillator layer, providing a space between the scintillator layer and a periphery of the second detector array to allow an electrical connector to couple with the second detector array.

15. The x-ray imaging device of claim 12 wherein the CMOS sensor comprises a wafer and the plurality of second detection pixels, and the CMOS sensor is disposed such that the wafer is in between the scintillator layer and the plurality of second detection pixels such that light detected by the second detection pixels passes through the wafer.

16. The x-ray imaging device of claim 10 further comprising a fiber optical faceplate (FOFP) disposed in between the scintillator layer and the CMOS sensor.

17. The x-ray imaging device of claim 16 wherein the CMOS sensor comprises a wafer and the plurality of second detection pixels, and the CMOS sensor is disposed such that the plurality of second detection pixels are in between the fiber optical faceplate and the wafer.

18. The x-ray imaging device of claim 3 wherein the first detector has a first active detection area defined by the plurality of the first detection pixels of the TFT detector array and the second detector has a second active detection area defined by the plurality of the second detection pixels of the CMOS sensor, said second active detection area is smaller than the first active detection area.

19. The x-ray imaging device of claim 18 wherein the first active detection area of the first detector covers substantially the entire first surface of the scintillator layer and the second active detection area of the second detector covers a portion of the second surface of the scintillator layer.

20. The x-ray imaging device of claim 19 wherein at least a portion of the second surface of the scintillator layer that is uncovered by the second active detection area is coated with a reflective coating.

21. The x-ray imaging device of claim 19 further comprising a detachable reflector covering at least a portion of the second surface that is uncovered by the second active area.

22. The x-ray imaging device of claim 19 wherein a portion of the second surface of the scintillator layer that is uncovered by the second active detection area is applied with an optical coating having a reflectivity substantially same as a reflectivity of the CMOS sensor.

23. The x-ray imaging device of claim 2 wherein the second detector comprises two or more CMOS sensors tiled side by side forming a rectangular or square active detection area.

24. The x-ray imaging device of claim 23 wherein said rectangular or square active detection area covers substantially an entire width or side of the second surface of the scintillator layer.

25. The x-ray imaging device of claim 1 wherein the first detection pixels having a first pixel size, and the second detection pixels having a second pixel size smaller than the first pixel size.

26. The x-ray imaging device of claim 1 wherein the first detector comprises a first TFT detector array and the second detector comprises a second TFT detector array.

27. The x-ray imaging device of claim 1 wherein the plurality of the first detection pixels define a first active detection area, and the plurality of the second detection pixels define a second active detection area smaller than the first active detection area.

28. The x-ray imaging device of claim 1 wherein the plurality of the first detection pixels have a first sensitivity, and the plurality of the second detection pixels have a second sensitivity greater than the first sensitivity.

29. The x-ray imaging device of claim 1 wherein the first detector comprises a plurality of first detection pixels having a first detection speed, and the second detector comprises a plurality of second detection pixels having a second detection speed greater than the first speed.

30. An imaging method, comprising:
positioning an imaging device relative to a body portion to be imaged, wherein the imaging device comprises:
a first detector array, a second detector array, and a scintillator layer between the first and the second detector arrays;
the first detector array comprises a plurality of first detection pixels defining a first active detection area configured to generate a first image with a first resolution, the second detector array comprises a plurality of second detection pixels defining a second active detection area greater than the first active detection area configured to generate a second image with a second resolution, wherein the second detection pixels are different from the first detection pixels, and the first resolution of the first image differs from the second resolution of the second image;
directing an x-ray beam to the body portion;
acquiring first image signals using the first detector array; and
acquiring second image signals using the second detector array.

31. The imaging method of claim 30 wherein the x-ray beam is collimated to provide a first beam portion and a second beam portion, the first beam portion has a first dose level and the second beam portion has a second dose level smaller than the first dose level, and the first image signals are acquired using the first beam portion and the second image signals are acquired using the second and first beam portions.

32. The imaging method of claim 30 further comprising the step of computing a third image using the first and second image signals.

33. The imaging method of claim 30 wherein the step of computing the third image comprises the step of interpolating the first image signals with the second image signals.

34. The imaging method of claim 30 wherein the first detector array is a complementary metal-oxide-semiconductor (CMOS) detector array, and the second detector array is a thin-film transistor (TFT) detector array.

35. An x-ray imaging device, comprising:
- a scintillator layer configured to generate light from x-rays, said scintillator layer comprises a first surface and a second surface;
- a first detector at the first surface configured to detect light generated in the scintillator layer, said first detector comprises a thin-film transistor (TFT) detector array comprising a plurality of first detection pixels having a first pixel size; and
- a second detector at the second surface configured to detect light generated in the scintillator layer, said second detector comprises a complementary metal-oxide-semiconductor (CMOS) sensor comprising a plurality of second detection pixels having a second pixel size smaller than the first pixel size, wherein the first pixel size is an integral multiple of the second pixel size.

* * * * *